US009316722B2

(12) United States Patent
Stayton (10) Patent No.: US 9,316,722 B2
(45) Date of Patent: Apr. 19, 2016

(54) SYSTEMS AND METHODS FOR PROVIDING ATC OVERLAY PROTOCOLS

(75) Inventor: Gregory T. Stayton, Peoria, AZ (US)

(73) Assignee: Aviation Communication & Surveillance Systems, LLC, Phoenix, AZ (US)

(*) Notice: Subject to any disclaimer, the term of this patent is extended or adjusted under 35 U.S.C. 154(b) by 335 days.

(21) Appl. No.: 12/910,642

(22) Filed: Oct. 22, 2010

(65) Prior Publication Data

US 2011/0090984 A1  Apr. 21, 2011

Related U.S. Application Data

(63) Continuation-in-part of application No. 12/105,248, filed on Apr. 17, 2008.

(60) Provisional application No. 61/253,981, filed on Oct. 22, 2009.

(51) Int. Cl.
*G01S 7/00* (2006.01)
*G01S 13/76* (2006.01)
(Continued)

(52) U.S. Cl.
CPC ............ *G01S 7/003* (2013.01); *G01S 13/765* (2013.01); *G01S 13/784* (2013.01); *H04L 5/02* (2013.01); *H04L 25/4902* (2013.01); *H04L 27/02* (2013.01); *H04L 27/10* (2013.01); *H04L 27/18* (2013.01); *H04L 27/183* (2013.01); *H04L 27/26* (2013.01); *H04L 27/32* (2013.01);
(Continued)

(58) Field of Classification Search
CPC ................................ G01S 7/003; G01S 13/765
USPC .......................................................... 342/36
See application file for complete search history.

(56) References Cited

U.S. PATENT DOCUMENTS 5,636,123 A * 6/1997 Rich et al. ..................... 701/301
5,691,723 A   11/1997 King et al.
(Continued)

FOREIGN PATENT DOCUMENTS

WO    2005025146 A1    3/2005
WO    2008134255 A2   11/2008

OTHER PUBLICATIONS

Federal Aviation Administration and Eurocontrol Experimental Centre. "1090 MHz Extended Squitter Assessment Report". 121 pages. Jun. 2002.*
(Continued)

*Primary Examiner* — Matthew M Barker
(74) *Attorney, Agent, or Firm* — Allen J. Moss; Squire Patton Boggs (US) LLP (57) ABSTRACT

An embodiment of the present invention sets forth a method for modulating a signal to include broadcast data, modulating the signal to include an overlay message comprising an address and data for an intended recipient, and transmitting the modulated signal including both the broadcast data and the overlay message including the address and data for the intended recipient. Another embodiment of the present invention sets forth a method for modulating a plurality of signal transmissions to include broadcast data, modulating the plurality of signal transmissions with an overlay message wherein the overlay message comprises a respective plurality of data segments, and transmitting the plurality of signal transmissions including both the broadcast data and the overlay message including the respective plurality of data segments. Further embodiments of the present invention set forth additional methods and related systems.

16 Claims, 8 Drawing Sheets

(51) Int. Cl.
*G01S 13/78* (2006.01)
*H04L 5/02* (2006.01)
*H04L 25/49* (2006.01)
*H04L 27/02* (2006.01)
*H04L 27/10* (2006.01)
*H04L 27/18* (2006.01)
*H04L 27/26* (2006.01)
*H04L 27/32* (2006.01)
*H04L 27/34* (2006.01)
*H04L 1/00* (2006.01)

(52) U.S. Cl.
CPC ........... *H04L27/3488* (2013.01); *H04L 1/0003* (2013.01); *H04L 1/004* (2013.01)

(56) References Cited

U.S. PATENT DOCUMENTS

| | | | |
|---|---|---|---|
| 6,433,729 B1 * | 8/2002 | Staggs | 342/29 |
| 6,545,631 B2 * | 4/2003 | Hudson et al. | 342/30 |
| 6,564,149 B2 * | 5/2003 | Lai | 701/301 |
| 6,584,384 B2 | 6/2003 | Gremmert et al. | |
| 7,414,567 B2 | 8/2008 | Zhang et al. | |
| 8,259,000 B2 * | 9/2012 | Fiori et al. | 342/93 |
| 2008/0103647 A1 | 5/2008 | Lucas et al. | |
| 2009/0172080 A1 * | 7/2009 | Pandit | 709/203 |
| 2010/0079329 A1 | 4/2010 | Stayton | |

OTHER PUBLICATIONS

Examination Report dated Mar. 10, 2015, issued by the European Patent Office for related EP Appl. No. 10790700.8.

International Search Report, issued by the International Searching Authority on Nov. 20, 2014 for related PCT Application No. PCT/US2014/046563.

Federal Aviation Administration, "Advanced Interval Management (Focus: RTCA Special Committee 214 Tasking) Preliminary Concept of Operations," Mar. 27, 2014.

* cited by examiner

Modulator

*Fig. 8*

Demodulator

*Fig. 9*

Gray Code Data Encoding ← 1020

| BIT 1 | BIT 2 | BIT 3 | Phase Shift State |
|---|---|---|---|
| 0 | 0 | 0 | 0 |
| 0 | 0 | 1 | π/4 |
| 0 | 1 | 1 | 2π/4 |
| 0 | 1 | 0 | 3π/4 |
| 1 | 1 | 0 | 4π/4 |
| 1 | 1 | 1 | 5π/4 |
| 1 | 0 | 1 | 6π/4 |
| 1 | 0 | 0 | 7π/4 |

Fig. 12

SYSTEMS AND METHODS FOR PROVIDING ATC OVERLAY PROTOCOLS

CROSS REFERENCE TO RELATED APPLICATIONS

This application is a continuation-in-part of and claims priority from U.S. patent application Ser. No. 12/105,248, filed in the name of the same inventor on Apr. 17, 2008 and entitled SYSTEMS AND METHODS FOR PROVIDING AN ATC OVERLAY DATA LINK and is further related to and claims priority from U.S. Provisional Patent Application No. 61/253,981, filed in the name of the same inventor on Oct. 22, 2009 and entitled SYSTEMS AND METHODS FOR PROVIDING ATC OVERLAY PROTOCOLS, the entirety of which are both hereby incorporated by reference.

BACKGROUND OF THE INVENTION

1. Field of the Invention

The present invention relates to systems and methods for encoding and modulating digital information, and more particularly, to systems and methods for providing protocols for alternative data links employing multiple modulation of air-traffic-control-related electronic signals.

2. Description of the Related Art

Travel by aircraft is generally a safe and efficient way for travelers to reach remote destinations. Over the years, as the popularity of air travel has dramatically increased, the need for techniques for safely managing the flow of aircraft has also risen. To address air traffic safety issues, aircraft have been equipped with avionics equipment such as transponders that assist air traffic controllers in identifying, tracking, and managing aircraft in flight.

Through radio frequency transmissions, transponders provide air traffic controllers and other suitably equipped aircraft with information such as aircraft identification, altitude, and other aircraft-specific data. Ready access to such information allows controllers and pilots to utilize airspace in a safer and more efficient manner. As the density of air traffic grows, it is understandable that there is a growing need for more information to be relayed between aircraft and ground stations on a near-real-time basis.

Currently, FAA Air Traffic Control and most other ATC controlling authorities around the world use standard modulation schemes to ensure interoperability of their radio frequency signals with other aircraft and systems. For example, the Minimum Operational Performance Standards for Air Traffic Control Radar Beacon System/Mode Select (ATCRBS/Mode S) Airborne equipment, promulgated by RTCA as RTCA/DO-181C (and incorporated by reference herein in its entirety) defines pulse position modulation on 1090 MHz for Mode S transponder and older transponder (ATCRBS transponders) replies to 1030 MHz ground station and TCAS interrogations. By using standard protocols aircraft state information as well as other data can be relayed aircraft to ground, ground to aircraft, or in some instances aircraft to aircraft.

The volume of information that must be transmitted from aircraft continues to increase as more advanced avionics and traffic control systems become available. Likewise, the need to transmit diverse information of all kinds also drives the desire to utilize aircraft systems to send data. However, because of the large number of required transponder replies in heavily traveled areas (such as in the vicinity of an airport, where hundreds of replies per second are generated), there are worldwide limits on the number of transponder broadcast transmissions permitted each second from each aircraft. For example, the limit for Automatic Dependent Surveillance Broadcast (ADS-B) is currently set to 6.2 transmissions per second to prevent the additional ADS-B interference from potentially all the aircraft near a major airport creating a situation where the ATC ground station becomes unable to receive surveillance replies from aircraft in the terminal area being controlled by ATC.

ADS-B squitter data content has already been defined for the most part by industry committees such as SC186, and there is little remaining room for future growth. In fact, systems currently envisioned and being developed by avionics systems designers will likely need to transmit more data than can be sent within the 6.2 squitters per second limit. The ability to employ more data in avionic systems is now and will continue to be needed.

The existing Mode S transponder reply data format (also known as squitters when they are sent unsolicited by an interrogation) is implemented with a pulse position modulation technique, where the position of a pulse determines whether a bit is a one or a zero. Referring to the transmission reply data format and timing diagram 200 in FIG. 2, the first four pulses 203 within the 8 microsecond preamble time 210 are called preamble pulses and are used to determine that the pulse position data that follows is for a Mode S reply (or squitter). ADS-B squitters use the long Mode S reply format and thus contain 112 bits in the data block 220 per squitter. In other applications, 56 bits may be transmitted.

Figure 2:
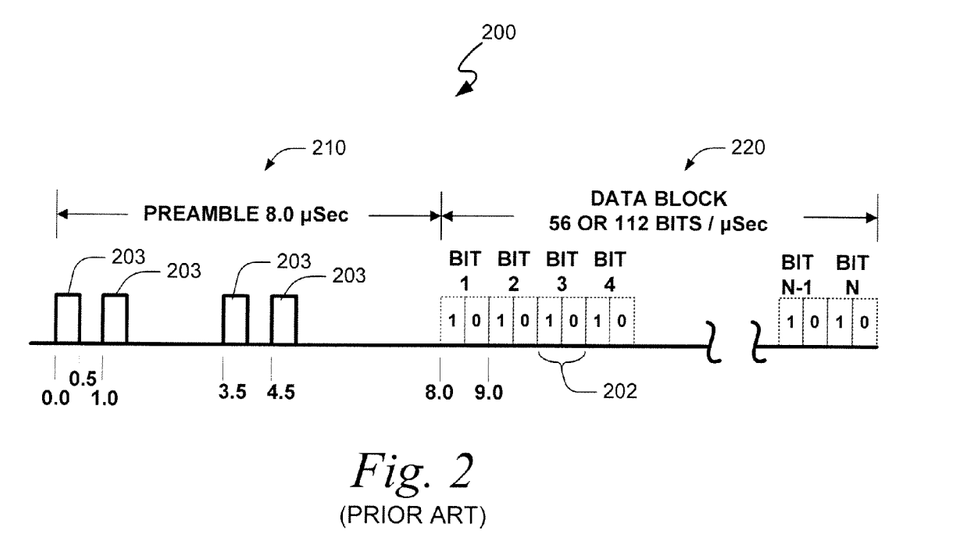
FIG. 2 illustrates a standard prior art transponder reply data format and timing diagram.

Data is transmitted through digital data encoded in the Data Block 220. A bit interval 202 comprises two sub-intervals defining the logical state of a bit symbol. When a pulse is in the "1" sub-interval position (FIG. 3, 301) of a bit interval 202, that bit value is a 1 and when a pulse is in the "0" sub-interval position (FIG. 3, 302) of a bit interval 202, that bit value is a 0. Only one pulse either in a "0" or a "1" position is permitted for each bit interval or bit symbol period (such as bit interval 202) of the entire message shown 200.

Figure 3:
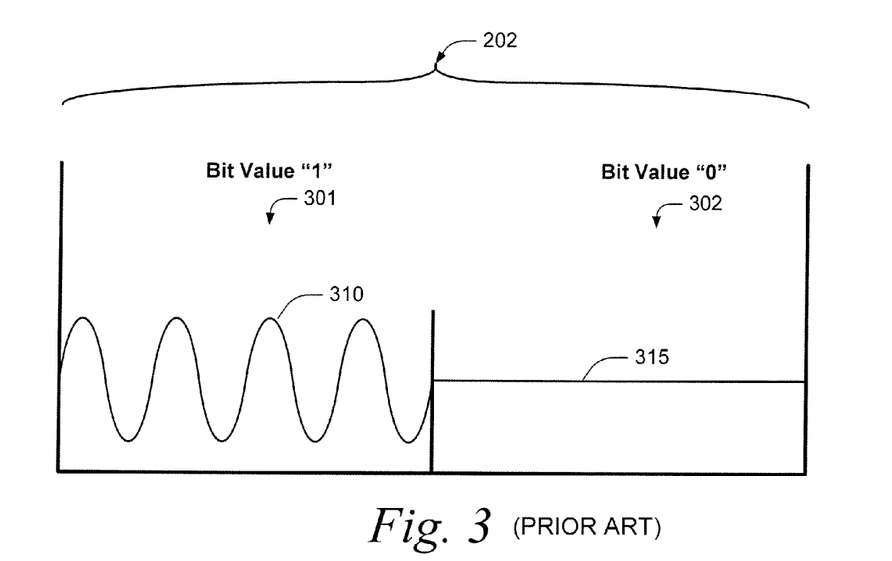
FIG. 3 depicts an expanded view of an exemplary bit interval of the reply data format, with a logical data value "1" pulse encoded.

Referring to FIG. 3, an expanded view of bit interval 202 is shown. A carrier wave in the form of a pulse waveform 310 is being transmitted in the "1" position 301, and no pulse is transmitted 315 during the "0" sub interval, and therefore, this bit interval represents the value of logical "1." Note that the sinusoidal waveform 310 provided in the drawing is for illustration purposes only, and as a standard frequency for ADS-B replies is currently 1090 MHz+/−1 MHz, approximately 545 cycles of the waveform 310 would normally occur during the 0.5 microsecond sub-interval 301. The phase of the waveform 310 is also unimportant for existing transponder reply standards. What is needed are methods and systems to make more efficient use of transponder reply messages to increase data throughput and provide for additional communication links.

Future applications, such as Airborne Conflict Management, may also need more flight plan data than is currently envisioned for such a system. Integrity numbers for this system are currently based on an assumed flight crew interaction with the environment, but sometimes flight crews don't fly as anticipated or more data may be needed to better understand what the flight crew is doing or is going to do. Weather is a factor that can cause changes to a planned flight path, while other factors, such as flight technical error and lack of more future waypoints, can lead to a lack of understanding of what the aircrew intent is relative to the total flight plan. For these and other reasons, more data will be required in the future for the more automated air traffic control of aircraft either nationally or worldwide.

In addition, means for overlaying additional data on existing ADS-B squitters and Mode S replies are known, as disclosed, for example, in the following ACSS applications, which are hereby incorporated by reference in their entirety: (1) U.S. provisional patent application No. 60/926,126, filed Apr. 24, 2007 and entitled "Systems and Methods of Providing an ATC Overlay Data Link"; (2) U.S. utility patent application Ser. No. 12/105,248, filed Apr. 17, 2008 and entitled "Systems and Methods for Providing an ATC Overlay Data Link"; (3) U.S. provisional patent application No. 60/931, 274, filed May 21, 2007 and entitled "Systems and Methods of Providing an ATC Overlay Data Link"; (4) U.S. provisional patent application No. 61/054,029, filed May 16, 2008 and entitled "Advanced ATC Data Link"; (5) U.S. provisional patent application No. 61/060,385, filed Jun. 10, 2008 and entitled, "Systems and Methods for Enhanced ATC Overlay Modulation"; (6) U.S. utility patent application Ser. No. 12/467,997, filed May 18, 2009 and entitled, "Systems and Methods for Providing an Advanced ATC Data Link"; and (7) U.S. utility patent application Ser. No. 12/482,431, filed June 10, and entitled "Systems and Methods for Enhanced ATC Overlay Modulation (hereinafter, collectively the "ACSS ATC overlay patents").

These additional overlay bits may be limited to PPM reply data bits. For an 8PSK overlay modulation, the additional bits may be limited to 3 additional bits for each PPM data bit. Thus, an efficient means for sending and receiving data using a defined protocol may be needed. Standard internet protocols, such as TCP/IP, use too much overhead for functions such as finding a MAC address.

SUMMARY OF THE INVENTION

In accordance with an embodiment of the invention, a method is disclosed comprising modulating a signal to include broadcast data, modulating the signal to include an overlay message comprising an address and data for an intended recipient, and transmitting the modulated signal including both the broadcast data and the overlay message including the address and data for the intended recipient.

In accordance with another embodiment of the invention, a method is disclosed comprising modulating a plurality of signal transmissions to include broadcast data, modulating the plurality of signal transmissions with an overlay message wherein the overlay message comprises a respective plurality of data segments, and transmitting the plurality of signal transmissions including both the broadcast data and the overlay message including the respective plurality of data segments.

In accordance with a further embodiment of the invention, a system is disclosed comprising a modulator for modulating a signal to include broadcast data and for modulating the signal to include an overlay message comprising an address and data for an intended recipient, and a transmitter for transmitting the modulated signal including both the broadcast data and the overlay message including the address and data for the intended recipient.

In accordance with yet another embodiment of the invention, a system is disclosed comprising a modulator for modulating a plurality of signal transmissions to include broadcast data and for modulating the plurality of signal transmissions with an overlay message wherein the overlay message comprises a respective plurality of data segments, and a transmitter for transmitting the plurality of signal transmissions including both the broadcast data and the overlay message including the respective plurality of data segments.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

As set forth above, means for overlaying additional data on existing ADS-B squitters and Mode S replies are known, as disclosed, in the ACSS ATC overlay patents, representative samples of which are set forth below, keeping in mind, however, that any of the techniques disclosed in the ACSS ATC overlay patents for overlaying additional data on existing ADS-B squitters and Mode S replies may be employed with systems and methods of the present invention.

ATC Overlay Techniques

Embodiments of the present invention provide methods for overlaying additional data on top of existing ATC data without affecting existing ATC transponder/TCAS/Ground Station/Multilateration or other existing equipment. Embodiments of the present invention may use any form of modulation overlaid on top of existing ATC data, and depending on implementation, the overlaid data may be undetectable by equipment that processes legacy ATC signals. This permits the use of existing equipment within the ATC environment, and the use of new equipment that can be either backwards compatible and/or independent of ATC existing data formats permitting more data throughput efficiency using the same ATC bandwidth and frequency assignments of 1030 and 1090 Mhz. Embodiments of the present invention utilize a transponder reply data format and timing diagram similar to that shown in FIG. 2. However, as discussed in more depth below, embodiments of the present invention provide additional modulation within each pulse interval 202 that may not be detected by existing ATC equipment or methods, but can provide additional data bits within the same reply.

Figure 1:
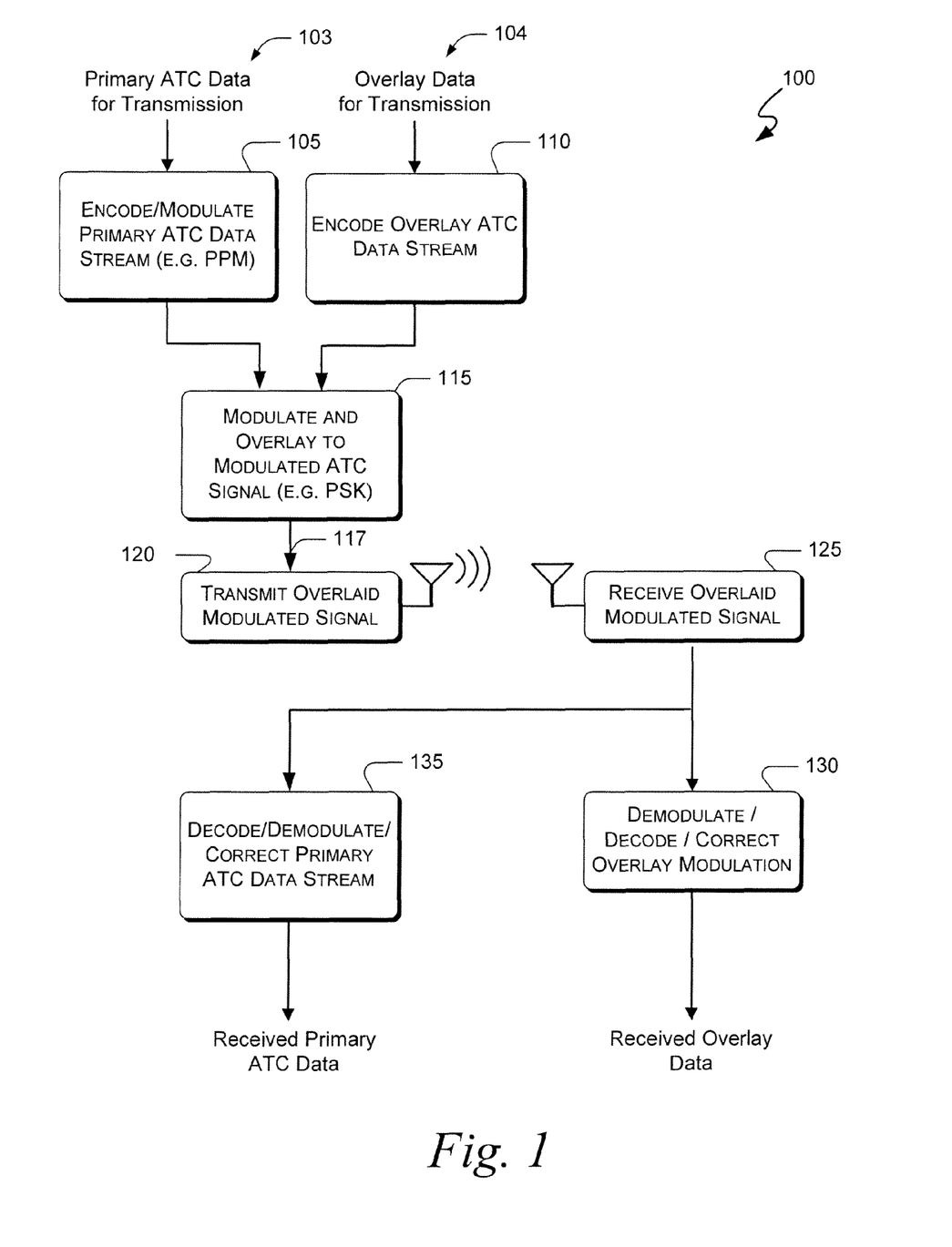
FIG. 1 illustrates a block diagram of an embodiment of a system of the present invention.

Turning to FIG. 1, a block diagram 100 illustrates an embodiment of a system of the present invention. A primary ATC data stream 103 is input to an encoder and modulator 105 that produces a modulated signal (such as by pulse position modulation) that complies with existing standards such as an ADS-B squitter or reply transmissions (see, e.g., FIG. 2). Data 104 that is desired to be transmitted through an overlay data link is encoded 110, if desired, with information such as parity bits, CRC (cyclic redundancy check) codes, encryption keys, or any other information or encodings that are desired to be applied to the overlay data. The encoded overlay data is then further 115 modulated into the modulated ATC stream 115 in a manner that provides a reply/squitter signal that is compatible with existing hardware yet contains information in excess of that defined by current transponder standards. One exemplary method to achieve such overlay modulation compatibility is to initially modulate the ATC signal with a pulse position modulation that is acceptable by currently deployed hardware, and then apply the overlay modulation with a technique such as phase shift keying "PSK." PSK is a digital modulation scheme that conveys data by changing, or modulating, the phase of a reference signal (e.g., the carrier wave), as opposed to selectively applying a pulse to bit symbol times as is utilized in pulse position modulation. Since varying the phase of the carrier signal within each defined time frame in an ATC-encoded reply signal does not impact the ability of legacy hardware to decode the original ATC data message, the PSK modulation is nondestructive and may be independently demodulated. Put another way, the twice-modulated signal 117 carries the ATC data 103 that is modulated and directly decodable by conventional PPM techniques, in addition to additional data 104 that has been overlaid on the modulated signal in a non-destructive manner, such as by PSK modulation.

The modulated signal 117 may then be transmitted 120 and received by a receiver 125 that is configured to receive ATC transponder reply transmissions (such as a ground station or another transponder in a suitably equipped aircraft). In various embodiments, the transmitter 120 and the receiver 125 may comprise any electronic equipment capable of sending and/or receiving RF signals, including, but not limited to ATC radars, TCAS transponders, ADS-B transponders, and ground stations of any type. In one embodiment, ADS-B ground stations can receive and transmit ATC Overlay messages on top of various outputs such as Traffic Information Service Broadcasts (TIS-B, Automatic Dependent Surveillance Re Broadcasts (ADS-R).

The received signal is then demodulated 135 by PPM demodulation 135 to recover the original primary ATC data 103 after any necessary decoding. The received signal is also demodulated 130 to obtain the overlay data 104, which may be presented in several channels after any necessary decoding. Therefore, the twice-modulated signal 117 may be demodulated with multiple techniques independently and each data stream (103, 104) respectively independently recovered.

Any form of modulation may be overlaid on top of any ATC-modulated signals, whether such modulation currently exists or is created at a future date. In alternate embodiments, additional data may be overlaid by modulation on top of an overlaid modulation as well, and this modulation is not limited to modulation that is undetectable by existing equipment. Further, the modulation is not limited to 1090 MHz squitters and replies, but can also be used on 1030 MHz (currently interrogation by radars and TCAS), on the General Aviation UAT transceiver UHF frequency band, ATC HF, VHF and UHF voice and data bands, on the VDL Mode 4 ADS-B modulation used for ADS-B in limited locales within Europe, DME; SATCOM; or any other avionics equipment that radiates a modulated RF signal and at baseband for ATC terminal or other networks currently sending data over landline or microwave links. Thus any form of ATC modulation that is used can have an overlaid modulation applied to it at any frequency. This can also include, for example, overlaid modulation on a modulation applied to Air Transport airborne weather radar for communication links. Therefore, embodiments of the present invention provide that any overlay modulation type (whether interfering in some manner or not) may be overlaid on or added to or encrypted with any modulation type for whatever purpose desired, such as, but not limited to ATC applications, any commercial data relay purposes, low probability of intercept applications, low probability of detection techniques, low probability of spoofing purposes, and encryption.

Figure 4:
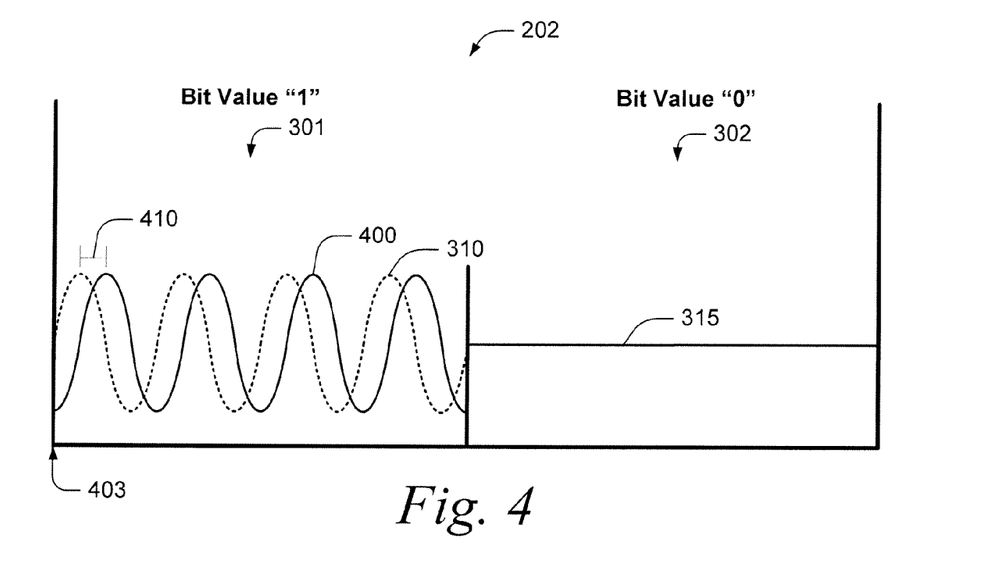
FIG. 4 shows one bit interval of modulated ATC signal with overlay data, where the carrier has been phase shifted ninety degrees, the phase shift occurring at or near the beginning of the bit interval.
Figure 5:
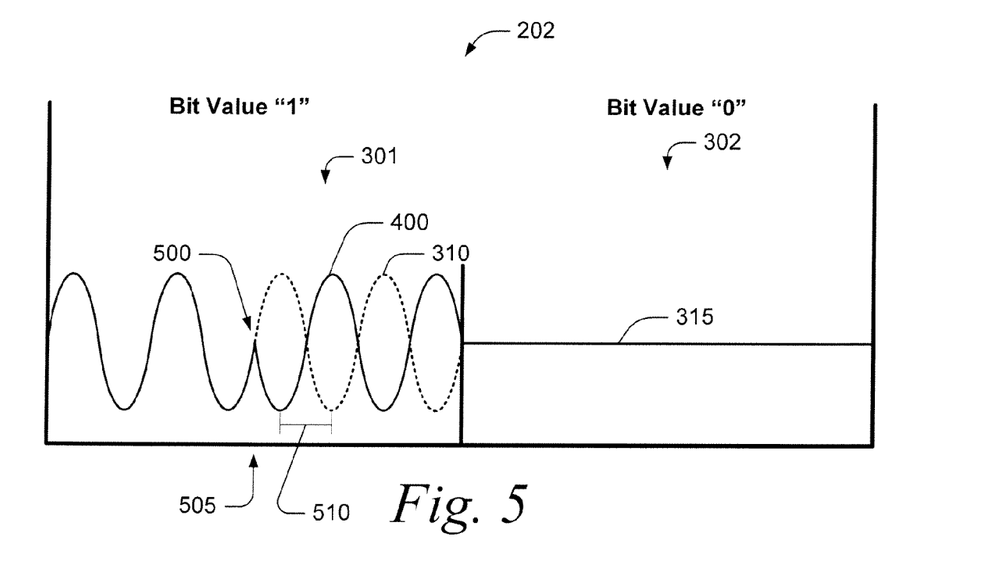
FIG. 5 shows one bit interval of modulated ATC signal with overlay data, where the carrier has been phase one hundred eighty degrees, the phase shift occurring approximately at the midpoint of a carrier within a sub-bit interval.

Embodiments of the present invention may employ phase shift keying (PSK) modulation within each of the 112 bit pulses in the data block 220. Turning to FIG. 4, an expanded view of one exemplary bit interval 202 of the data block 220 is shown, with an ATC data value of logical "1" (carrier pulse 400 is present in "1" sub-interval position, 301) and the phase shifted carrier signal 400 is overlaid with phase modulation by phase shift 410 of ninety degrees. The phase shift in this embodiment occurred at or near the beginning 403 of the logical "1" sub-interval position 301. The original unshifted carrier signal 310 is shown for comparison. Depending on the particular PSK implementation, this phase shift may correspond to one bit or several bits of overlay data. Note that the sinusoidal waveform 310 provided in the drawing is for illustration purposes only, and as a standard frequency for ADS-B replies is currently 1090 MHz+/−1 MHz, approximately 545 cycles of the waveform 310 would normally occur during the 0.5 microsecond sub-interval 301. As the applicable ATC standards do not care about the phase of the carrier wave, the presence of an acceptable frequency and amplitude waveform in the appropriate bit sub-interval position 301 is all that is needed to provide the logical "1" originally encoded.

Phase information can then be sent with a differential phase between each pulse representative of a plurality of states used to represent a plurality of bits. Each phase difference is detected by examining the phase of a previous pulse to the phase of the next pulse to eliminate the effects of relative aircraft motion. For the first phase reference pulse relative to Bit 1 case, any of the preamble pulses 203 may be used, and from then forward each previous bit pulse phase can be used as the reference for the next bit phase.

Other PSK methods can be used to send data such as a synchronous transmission of phase, where comparison to a reference that is synchronized in phase to the incoming reply signal modulation is used to determine a phase value for each pulse. The preamble pulses of the Mode S reply message can be used to synchronize a reference oscillator source to the incoming message RF signal using, for instance, a phase-locked-loop oscillator or a Costas loop that can be locked to the incoming signal phase and frequency, which is then used as a phase reference for all the data bits.

Figure 6:
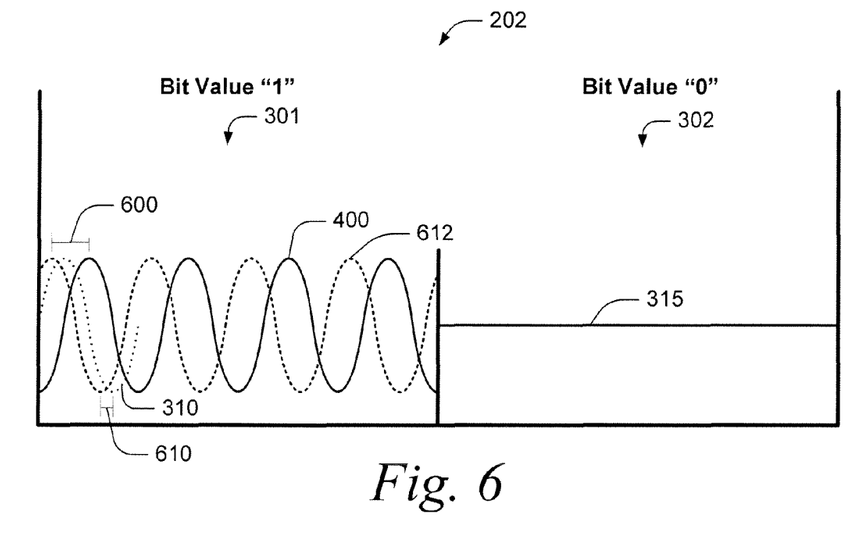
FIG. 6 shows one bit interval of modulated ATC signal with overlay data, where the carrier has been phase shifted ninety degrees, and frequency drift has affected the carrier.

In legacy ATC systems, the frequency of the signal being transmitted are in the range of 1090 MHz plus or minus 1 MHz, and drift of the phase of the carrier signal is generally not of concern provided the signal envelopes within predetermined timing intervals is within established ranges, such as those set forth in RTCA standard DO-181C. To recover a phase shift encoded within the broadcast carrier signal, embodiments of the invention provide for obtaining the data phase by synchronous or asynchronous means. Turning to FIG. 6, original carrier 310 (shown only partially for clarity) would have undergone a frequency drift 610, producing a new drifted-phase carrier 612. Without knowledge of the amount of drift 610, the exact phase of the phase-shifted carrier 400 may be difficult to determine. In one embodiment, phase drift 610 is accounted for via phase synchronous means but with the frequency asynchronous, for instance by utilizing an integrator and accumulating and storing the phase drift as a phase error signal that can be subtracted out from the phase of the current signal. In another illustrative embodiment, after a predetermined amount of data pulses are received (for instance 7 pulses), a local oscillator tracks the received signal via a Costas loop, allowing frequency and phase synchronization. The local oscillator is then driven with an offset frequency to maintain synchronization. Through this approach, interfering signals with different frequencies can be distinguished through use of a matched filter, and through use of matched filters with synchronized frequency and phase, noise performance can be improved significantly, for instance by about 3 dB.

Aircraft motion and signal-to-noise-ratio, as mentioned above, may be taken into account when determining an acceptable bit error rate (BER). For instance, if two aircraft, one transmitting a reply and the one receiving the reply are traveling towards one another at a rate of 1200 knots, which is 2000 ft. per second, the relative velocities can significantly affect the phase error seen by the receiving aircraft. Since the wavelength in free space is about 1 foot at ATC 1030 MHz and 1090 MHz frequencies, a phase error of about 2000 ft./sec.× 360 degrees phase×112 usec ($112 \times 10^{-6}$ seconds per Mode S reply message length)=80 degrees phase error. Since the 80 degrees of error is spread over the entire Mode S message and each phase can either be differentially compared from the previous to the next bit or synchronized out as described above, the phase error between each bit then is about 80 degrees/112 bits per microsecond=0.71 degrees phase error per bit. Thus, any encoding scheme that can tolerate a phase error of 0.71 degrees between each bit is realizable, but is also affected by the signal to noise ratio to accurately measure phase. For a reasonable signal to noise ratio that exceeds 10 db, a PSK encoding scheme that provides 360 states or 1 degree per state could be tolerated. Usually a power of two is used for binary encoding, so 256 ($2^8$) states could be used to provide 8 bits of data per PPM pulse.

Figure 10:
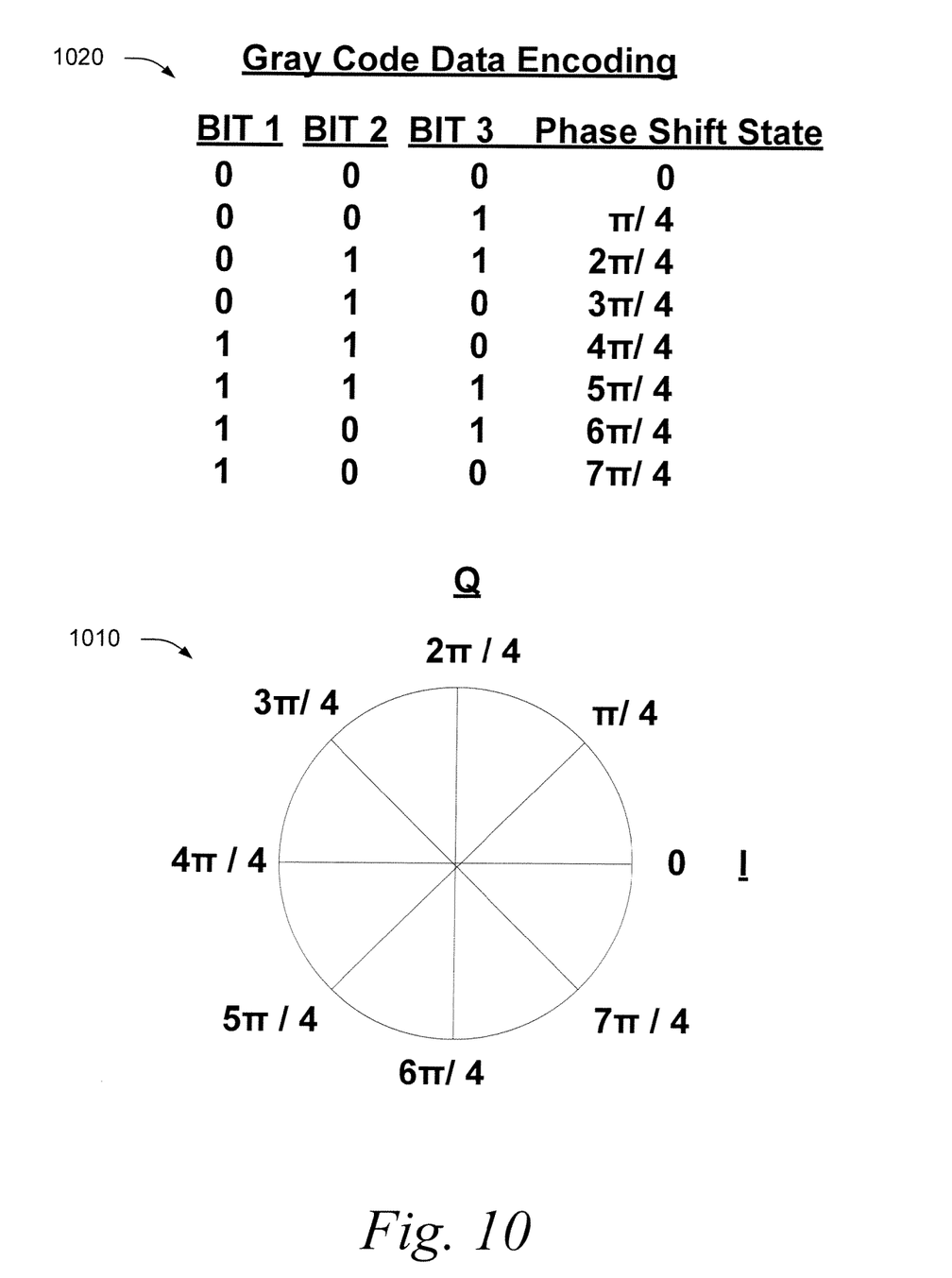
FIG. 10 shows a constellation diagram and corresponding Gray Code symbol assignments for an 8-PSK modulation scheme of the present invention.

To decrease the effects of noise on signal to noise ratio, embodiments of the present invention use a D8PSK (Differential 8-state Phase Shift Keying) modulation scheme. Referring to FIG. 10, each of 8 states is shown from 0 degrees through 360 degrees with each state separated by 45 degrees representing 3 bits. This provides 112 bits×3=336 bits per message additional to the 112 bits of the original Pulse Position Modulation (PPM) Mode S reply message. Thus, if an additional 3 bit message is sent for each of 6.2 squitters per second, a total of 336 bits per message×6.2 messages=2083 additional bits can be sent via the overlay modulation. Therefore, by modulating each pulse-bit whether in the zero or one position, with D8PSK modulation, a new data link is then created with 3 bits of data for every previous PPM bit. In one embodiment, the new data link would not be detected by existing ATC TCAS and transponder equipment unless it is equipped to detect the D8PSK modulation, ensuring backward compatibility with existing systems.

In various embodiments, states can be encoded to reduce the number of bit errors per symbol. Other schemes using additional parity bits to produce symbols that are completely orthogonal can be used to provide additional interference immunity.

In alternate embodiments, modulation schemes providing more bits per second such as D16PSK (4 bits per message bit) or D32PSK (5 bits per message bit) can be used depending on the amount of noise immunity versus data rate required. Secondary modulation schemes may also be used in conjunction with error correction and control schemes in order to minimize bit error rate and correspondingly increase signal to noise ratios in noisy environments. Also, bits can be encoded into states that only permit one bit change per adjacent state change (Grey Code). This can reduce bit errors to only one bit for changes between adjacent states and helps with noise and interference immunity, as discussed later.

Figure 7:
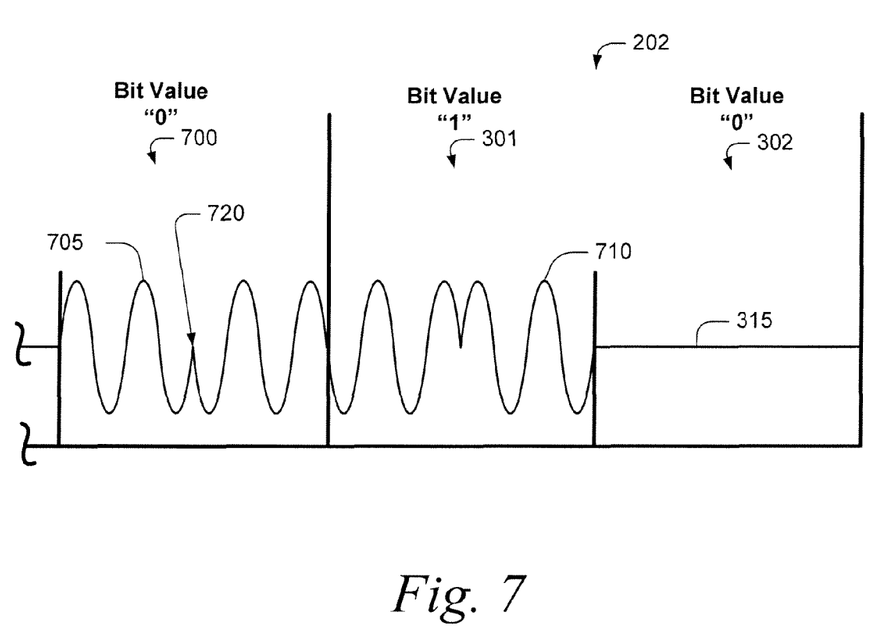
FIG. 7 illustrates one and one half bit intervals, illustrating a merged carrier signal from a bit value of 0 from a previous bit interval, and a bit value of 1 from a following bit interval with midpoint one hundred eighty degree phase shifts.
Figure 8:
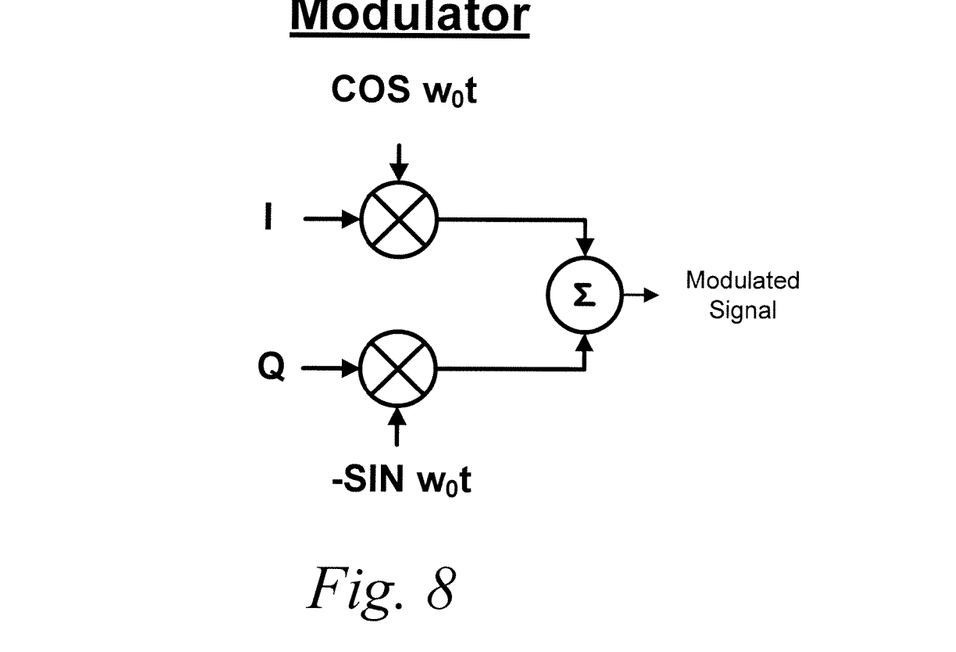
FIG. 8 shows an exemplary modulator of the present invention.
Figure 9:
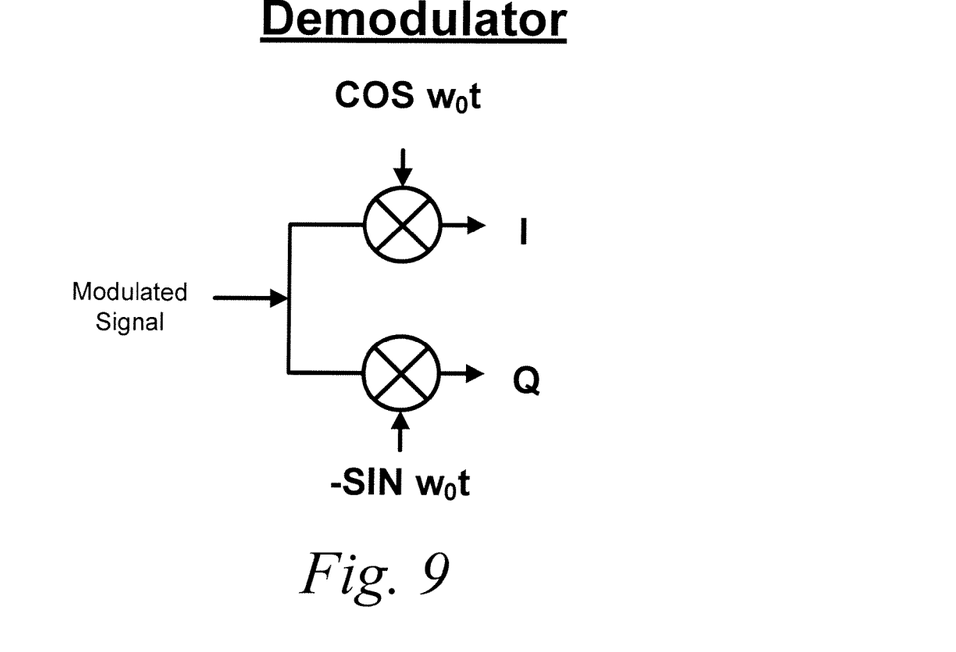
FIG. 9 illustrates an exemplary demodulator of the present invention.

Additional techniques can be used to minimize frequency spectral power effects or bandwidth required to accommodate the additional modulation. For instance, when two pulses are positioned next to one another, such as shown in FIG. 7, and in the case of a sudden change in phase 720 in the first pulse 705 to a different phase in the next pulse 710, an amplitude notch may occur between pulses affecting the bandwidth of the reply. However, if the phase is slowly varied between the middle of the first pulse to the middle of the second pulse, the phase variation occurs over a greater time period and the amplitude notch can be made to be very small, permitting compliance to existing bandwidth requirements for Mode S replies and having no effects upon existing equipment in the field. The phase information can then be read in the beginning of the pulse for the first bit interval (before any phase changes to the next pulse) and near the end of the second pulse for the second bit interval (after a phase change from the first to the second pulse is complete) when two pulses have merged into one, permitting the use of this MSK (Minimum Shift Keying) phase change technique. This approach also can be adapted for significant or multiple intra-sub-interval phase shifts, if embodiments provide for multiple phase shifts per sub-interval.

MSK type of modulation phase change across the pulse will further reduce any spectral effects. The worst case spectral effect is for a phase shift from 0 to 180 degrees, and could be accommodated and tested to ensure compliance with existing industry specifications for a Mode S reply. Spectral and amplitude specifications for Mode S reply emissions can currently be found in RTCA DO-181C.

Additional modulation types with varying degrees of BER, detection gain, and bit throughput can be used. These include, but are not limited to: general phase shift keying modulations; binary phase shift keying modulation (BPSK); quadrature phase shift keying modulation (QPSK); 8-phase shift keying modulation (8-PSK); differential phase-shift keying (DPSK); DNPSK modulation, where N is an even integer and a multiple of 2; frequency shift keying (FSK); amplitude shift keying (ASK); quadrature amplitude modulation (QAM);

orthogonal frequency-division multiplexing (OFDM); minimum-shift keying (MSK); asymmetric phase-shift keying, (APSK); pulse position modulation (PPM); amplitude modulation (AM); frequency modulation (FM); or any other modulation form using amplitude, phase, or frequency signal characteristics and methods of use; and combinations of modulation techniques.

In principle, any modulation type can be used, but should be constrained to meet DO-181C amplitude and spectral requirements such that existing ATC equipment is not affected, but new equipment can transmit and detect the overlaying modulation. In addition, some form of bit error detection and correction can be used such as that presented in RTCA DO-181C, Mode S Minimum Operational Performance Specification, and RTCA DO-185A, TCAS Minimum Operational Performance Specification, as an example to improve message reception.

A more suitable means of bit error detection and correction for Phase Shift Keying modulation can, for example, include the use of additional bits to provide orthogonal symbol (cross correlation is zero for one bit errors) encoding with zero correlation between symbol sets (bit patterns between symbols are significantly different by several bit states). For example, the bit values can be represented, as shown below in Table 1 (for two bits to simplify the discussion). Note that this method may require that more bits be used within each symbol to represent the lesser number of bit values (or states), so that a more unique bit pattern is transmitted and received, and can be corrected in the presence of noise or interference with a higher degree of certainty.

TABLE 1

| Bit Values | Symbol Data |
|---|---|
| 00 | 0000 |
| 01 | 0101 |
| 10 | 1100 |
| 11 | 1001 |

Another embodiment of the present invention addresses limiting the effect of burst errors, such as for a single interfering pulse where the "BIT 1" pulse position of the Mode S reply has been overlaid by a stronger in amplitude interfering pulse. This situation could destroy an entire 3 bit symbol for the case of D8PSK (3 bits per symbol). However, if each D8PSK bit value is sent as only one bit of 3 separate messages, then only one bit of each message may be affected, making it possible for 2 of the messages to remain uncorrupted. For example, from Table 1, the last bit of the Symbol Data for Bit Value 10 could be corrupted into a 1, resulting in the sequence from Table 1 to be a 1101 instead of a 1100. Then, the 1101 is incorrect, since it is not a valid symbol and by knowing which bit has been corrupted from the interfering pulse position it is possible to determine that 1100 is the correct symbol for a one bit error, since none of the other symbols are of the form "11XX".

Non-ideal communications channels, noise, atmospheric conditions, interference, or other phenomena may induce errors into the message being communicated, whether or not the transmitted message has been overlaid with additional encoded information. In various embodiments of the present invention, conventional error reduction or correction approaches may be applied to reduce bit error rate, such as utilization of a parity overlay or CRC check scheme as described in RTCA/DO-181C, Reed-Solomon bit error detection and correction, or other error conventional detection and correction schemes.

Embodiments of the present invention include the use of a Gray-Code for each phase state transmitted which is most useful for the case where an interfering pulse is near to the same amplitude as the data pulse and cannot be detected, use of a four bit message symbol where only one parity bit is used for every three message bits to detect and correct single bit errors (as opposed to traditional 8 bit symbols where half the bits are parity bits), interleaving of message bit symbols to limit the number of errors per message symbol due to sequential interfering pulses so that most errors can be corrected (after de-interleaving) by changing the state of a single bit, and using a parity overlay encoding scheme on top of the last 24 bits of the address of the intended recipient for point to point messaging or with an all ones address for broadcast messages as is done now for Automatic Dependent Broadcast messages (ADS-B) as described in RTCA DO-260A ADS-B MOPS in conjunction with the error detection and correction algorithm as described in RTCA DO-185A TCAS MOPS. Alternate embodiments provide methods for bit error detection and correction, and may be more efficient in terms of the number of phase message bits that can be corrected per each 112 bit PPM Mode S reply.

Message Protocols

Figure 11:
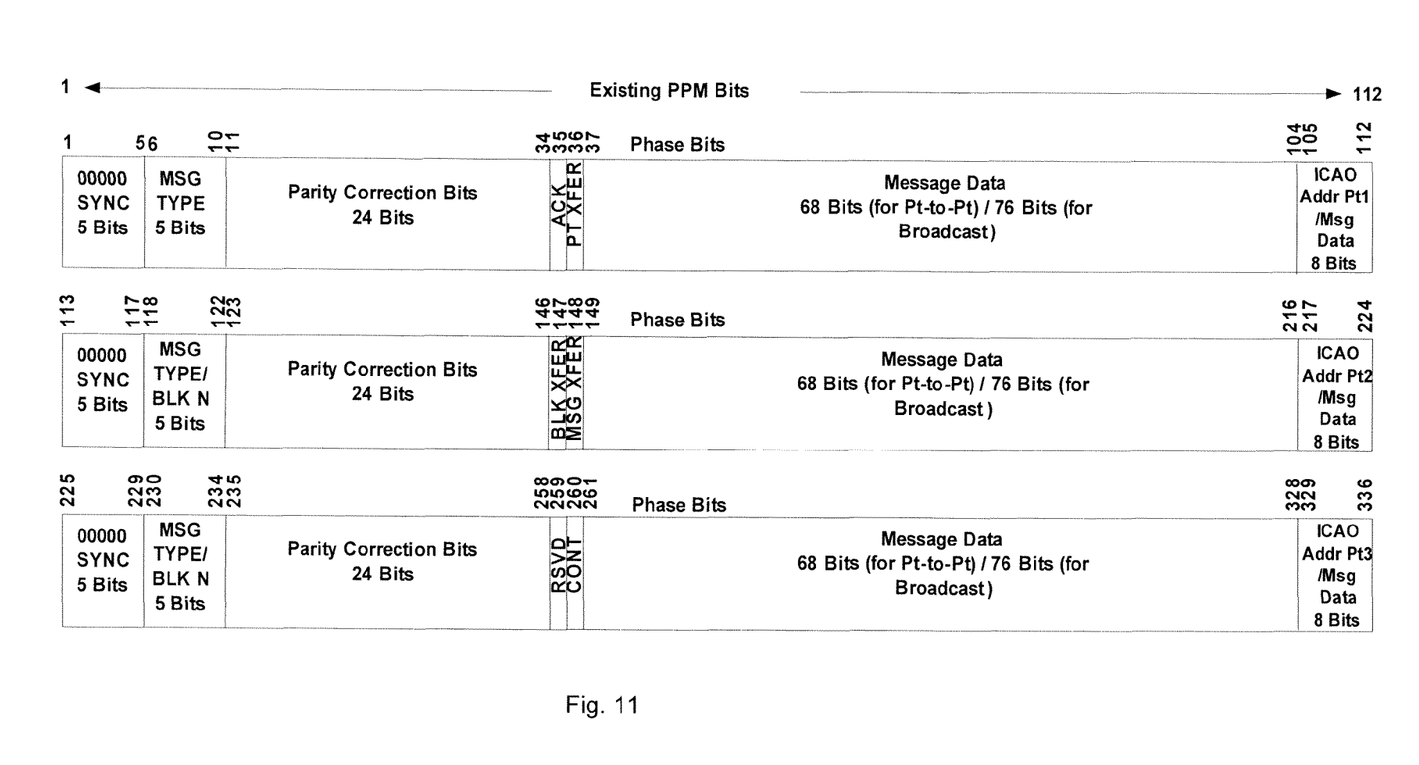
FIG. 11 illustrates an exemplary overlay message format, in accordance with systems and methods consistent with embodiments of the present invention.

Any desired message protocols using the 336 bits of the message data shown in FIG. 11 can be supported by embodiments of the present invention. The order of the message bits, the number of the bits within the fields, and the number or type of fields shown in FIG. 11 are exemplary only, and can be defined as desired to support any of the various protocols defined by embodiments of the present invention. These messages can be sent in any desired manner, such as by using a multiple modulation, multiple encoding, or signal overlay approach. For example, these messages may be transmitted by one or more ATC data overlay methods, as described in one or more of the ACSS ATC overlay patents. Moreover, these messages can be sent using any scheme disclosed in the ACSS ATC overlay patents on top of asynchronous PPM ATC message data bits or can be on a new waveform that is sent on an asynchronous or synchronous waveform (such as but not limited to the use of a CDMA type of message).

Referring to FIG. 11, an exemplary message for overlaying (an exemplary overlay message) is depicted in three separate parts or bit segments, as described below. On top, a first bit segment is shown including 112 bits, numbered 1 to 112. Starting from the left and moving right, there are 5 synchronization bits. Next, there are 5 bits that may be employed to identify the type of message (MSG TYPE) associated with the overlay message. Next follows 24 parity correction bits. After the parity correction bits are an acknowledgement (ACK) bit and a point-to-point transfer (PT XFER) bit. The acknowledgement (ACK) bit may be employed to acknowledge the receipt of a transmitted message from a receiver. The point-to-point transfer (PT XFER) bit may be employed to indicate that a particular overlay message is a point-to-point message (i.e., a message that is intended to be sent from one point to another point). Thereafter, the message data itself follows, comprising either 68 bits (for a point-to-point transmission) or 76 bits (for a broadcast transmission). After the message data follows an 8 bit segment including the address for the intended recipient of the message. In one embodiment, this address comprises an ICAO (International Civil Aviation Organization) address for the intended recipient. Of course, if the message is a broadcast transmission (i.e., not a point-to-point transmission), then the address is not needed and the 8 bits shown here may be employed as additional data bandwidth. Consequently, the message data block may comprise 68 bits of data for point-to-point communications and 76 bits for broadcast communications. Finally, the upper bit segment is identified as "Pt1" which stands for part one.

Moving down in FIG. 11, and again from left to right, a similar bit segment or string is shown including five synchronization bits. Five bits follow to identify the message type (MSG TYPE) or which block (BLK N) is associated with the message (i.e., is this block 1, block 2 or block N). Thereafter follows 24 parity correction bits, followed by a block transfer bit (BLK XFER) and a message transfer bit (MSG XFER). Broadcast transmissions can be sent as a block by setting the "BLK XFER" bit or as three separate message types by setting the "MSG XFER" bit. When sent as a block, the first set of MSG TYPE bits may be the message type for the entire block. When three separate messages are sent each of the MSG TYPE fields may be associated only with their separate message data (Message Data bits). Next, follows the message data, again comprising 68 bits or 76 bits, depending on whether it is a point-to-point transmission or a broadcast transmission. Similarly, thereafter follows 8 bits to identify the addressee for the intended message, which may comprise an ICAO address.

Again, moving down from left to right in FIG. 11, a third bit segment is shown. There are 5 synchronization bits, followed by 5 bits to identify the message type (MSG TYPE) or which block (BLK N) is associated with the message (i.e., is this block 1, block 2 or block N). Thereafter follows 24 parity correction bits, followed by RSVD and CONT bits. The CONT bits may be employed to indicate whether the transmission continues with the next segment of an overlay message or whether the current segment represents the end of a block transfer. Thereafter follows another message data block including 68 bits or 76 bits, as previously noted, followed by the Part 3 address window of 8 bits, which again may comprise an ICAO address.

As noted herein, this representation of an overlay message format is merely exemplary. The overlay message may take any desired format, however in this exemplary format of an overlay message, the overlay message includes three data or bit segments concatenated one upon the other, as represented by the upper data segment including bits 1-112, the middle data segment comprising bits 113-224 and the final data segment comprising bits 225-336, as indicated in FIG. 11.

As those skilled in the art will appreciate, ATC data overlay may utilize an existing squitter, as represented in FIG. 2, and upon which the overlay message may be modulated. So, by way of example, a squitter, as represented in FIG. 2, may have overlaid or modulated upon it the first bit string, as represented by bits 1-112 in FIG. 11, followed by a subsequent squitter, again as represented by example in FIG. 2, having overlaid upon it a second bit string comprising bits 113-224, as shown in FIG. 11. And finally, a third squitter, again as represented by way of example in FIG. 2, may have overlaid upon it a third bit string, as represented by bits 225-336 in FIG. 11. As indicated herein, any ATC data overlay technique may be employed to overlay a message upon a squitter. In this regard, any of the ATC data overlay patents incorporated herein by reference may be employed to provide an ATC data overlay technique to be used as described herein. Finally, it also bears mentioning that while the 3 bit strings or segments, as shown in FIG. 11, are shown by way of example to represent an overlay message, an overlay message may comprise any one of the bit strings individually, or may take any other desired format.

Figure 12:
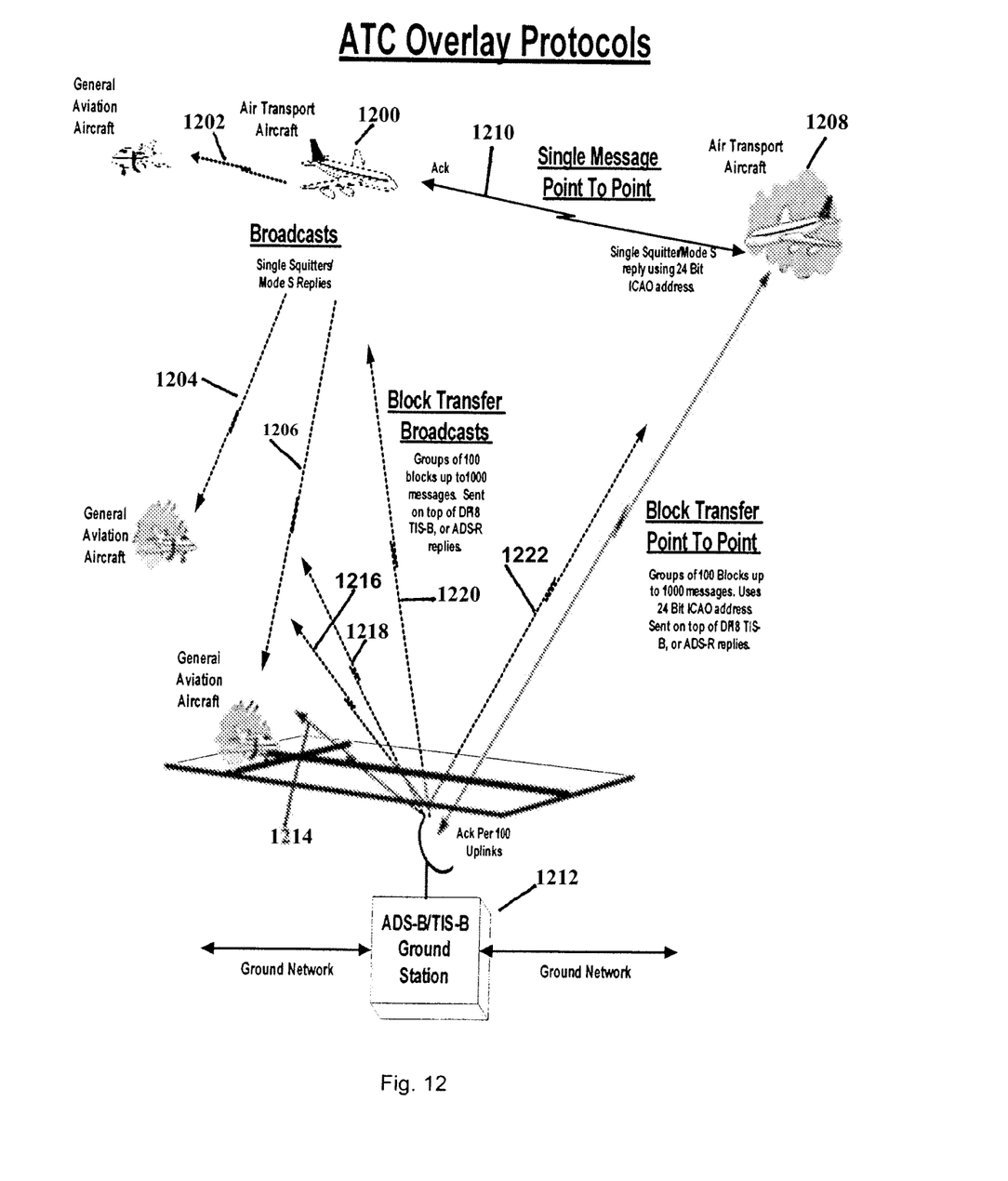
FIG. 12 illustrates various ATC overlay protocols, in accordance with systems and methods consistent with embodiments of the present invention.

Referring to FIG. 12, several ATC overlay protocols are depicted. First, by way of introduction and comparison, there is a simple broadcast or a data broadcast, which is known in the art. This is represented by aircraft 1200 broadcasting 1202-1206 as either a single squitter or a mode S reply, as is known in the art. Such broadcasts are known and are sent to no particular target. In contrast, aircraft 1208 is not broadcasting but is instead sending a single message point-to-point 1210, which in this instance includes an acknowledgment (Ack) back to aircraft 1200, presumably in response to aircraft 1208 having received a transmission from aircraft 1200. The transmission from aircraft 1208 to aircraft 1210 is not a broadcast (not a general dissemination of information) but a targeted communication to aircraft 1200 and would employ an address, such as the ICAO, described herein to facilitate such targeted communication. Also represented in FIG. 12 are block transfers (or block communications). Here, in contrast to sending a single message to a recipient, the message may comprise a block of messages to deliver the required content. Block transfers may be either of a broadcast type, as represented by ground station 1212 sending a block transfer broadcast 1214-1220, or a point-to-point block transfer 1222.

Still referring to FIG. 12, point-to-point data transfers are supported where the data is sent to a particular receiver (whether on the ground or in the air and whether in an aircraft or ground station or any other object) using a predefined address, such as an ICAO 24 bit address. When the data is received, an acknowledgement (Ack) may be sent by the receiver to the transmitter of the data to provide confirmation that a particular message has been sent and received. If it is not received or an Ack is not heard, the subject message can be sent again until it is established that it has been received, as may be confirmed by receipt of an Ack by the transmitter of the data.

These messages may be used for a one time or infrequent transmission of unique and/or critical data that may be needed by an aircraft that is coupled to another aircraft for a particular application. An example of this could include an application such as flying in an independent parallel approach mode to two separate runways where the flight path information of each aircraft has been sent between them so that each aircraft knows that it is on a non-conflicting path to their own parallel runway and not headed to the same runway at the same time due to a pilot or controller error. This can be particularly important in conditions where visibility can be reduced to a point where the other aircraft cannot be seen.

For point-to-point messages where more than one squitter or phase message may be sent, block transfers, a selective repeat methodology may be provided where any non-received message data can be requested to selectively be sent again by the receiver so that the entire block does not need to be retransmitted.

Another protocol supported is a broadcast message. These may be sent to all aircraft within receiving range and can be single squitters or a data block consisting of many squitters. This type of data may be useful for repetitive information that may need to be sent on a regular or more frequent basis.

A mixed format of the two types of messages; i.e., point-to-point and broadcast messages can be supported where one set of data within a squitter may be sent to a particular ICAO 24 bit address or particular aircraft and the remaining message data may be sent to all aircraft within receiving range.

Finally, additional protocols and message types can be included with the use of a field that may indicate that an additional set of bits may be used to provide information on what additional newly defined protocol is to be used.

Point-to-Point Transfers

The "MAC" address in ATC squitters and Mode S replies may be defined to be a unique combination of 24 bits associated with each aircraft and in some circumstances ground stations. This address may comprise the ICAO 24 bit address and is broadcast by aircraft equipment at least once per second. From this broadcast, all the ICAO addresses are known for all aircraft within transmitting range of another aircraft or ATC Mode S ground station. Thus, there is no need for using a protocol to find aircraft with an ICAO address that are also equipped to send and/or receive ATC overlay phase bits.

Referring to FIG. 11, the ATC overlay protocols support point-to-point transfers that can be a single block of 336 bits or multiple blocks of up to 1023 blocks for a total of 1023× 336=343,728 bits. These transfers may be accomplished by the transmitter using the ICAO 24 bit address (Mode S address) bit fields, see FIG. 11 (Part 1, Part 2, and Part 3 concatenated in order), as the intended receiver address, and use the receiver's Ack reply back to the transmitter to indicate which blocks were received or not received out of the "N" blocks expected. Thus, the Ack may be used to indicate which blocks need to be re-sent by the transmitter, so that the receiver has a complete block set of "N" blocks prior to receiving the next message of N blocks from that transmitter. An Ack (acknowledgement) message may be indicated by setting the "ACK" bit.

When sending a point-to-point series as a block transfer, the "PT XFER" (point-to-point transfer) bit may be set. In addition, if more than 1 block is to be sent ("N" blocks), the "CONT" (continuation) bit may be set to indicate that an additional block or blocks may be sent. The last block of the entire transfer does not have the "CONT" bit set, and the number, N of this block may be equal to the same number, N contained by the first block that may be used to indicate how many blocks are to be sent. If the receiving system receives a last block with a bit error where the "CONT" bit is set by a given transmitter, it may interpret this as the first block of the block transfer and may throw the data away and not Ack. The second block of any N block transfers may be numbered as 1, and the last block of the N block transfer may be N, as described above. The number of blocks to be sent may be contained within the second and third "MSG TYPE" fields. The maximum total number of blocks that can be sent may be represented by these 10 bits and may be 1023 blocks.

When the total number of blocks in an N block set to be sent exceeds 100 each set of 100 blocks may be Ack'd once the last block of the N block set is received, or after 1 second of no receipt of additional expected data. In addition, any blocks in the N block set not received or not properly decoded by the receiver may be indicated within the Ack receiver transmission. The first 50 bits of the first set of Ack message bits (bits 37 through 86) and the first 50 bits of the second set of Ack message bits (bits 149 through 198) may be used to indicate which block numbers (1 to 100) have been or have not been received. Received blocks may be indicated by setting the bits to a 1 for each block which has been properly received and to a zero for each block not properly received. The transmitter may then send a smaller group of blocks that have been indicated as not received back to the receiver. The same type code may be sent, but only the blocks not received properly may be included in the group. The number of blocks to be sent may be indicated as the appropriate subset of N where N now equals the total number of blocks not received by the receiver. The number of each block for this subset may still match the number of the block when it was sent previously. The receiver may then send an Ack containing any further additional blocks not received once the last block of the N block set is received or after 1 seconds of no receipt of additional expected data. Acks may be transmitted at a rate of at least two per second or as otherwise desired.

Following the transmission of Acks by the receiver and after two seconds of no receipt of additional expected data by the receiving system, it may stop transmitting Acks, but retain the correctly received portion of the N block set for eight seconds. The transmitter may then after not receiving an Ack for three seconds (to make sure the asynchronous link timing of a possible Ack that is not being decoded due to interference or noise is completed) send the N block set or selective repeat group of blocks again. Five total attempts to send the complete N block set or selective repeat group of blocks may be made. If this is not successful, then the block transfer may be terminated, and may start over again when properly initiated by the application. The first MSG TYPE field may be toggled between two states so that the receiver will be aware of any change in the data being sent. If an entire N block set is not completed prior to receiving a toggled MSG TYPE field, then the receiver may discard that N block set and initiate a new N block set. Thus an even and an odd MSG Type field may be assigned to N block sets.

Blocks of a multiple block transfer can be sent air-to-air whenever a 112 bit PPM squitter is sent or every 10 msec by a ground station for a total of 100 blocks per second where the ground station is transmitting a PPM 1090 MHz TIS-B and/or a 1090 MHz filler overlay transmission where needed to maintain a constant availability of the data rate bandwidth. The timing of successive transmissions can be variable to prevent synchronous interference to or with other transmitters on the same frequency.

The "MSG XFER" bit and/or the "BLK XFER" bit cannot be set when the "CONT" bit is set. If this is received then an Ack is not sent by the receiver.

Broadcast Messages

Broadcast messages do not need a receiver address so the ICAO ADDR Part 1, 2, 3 bits may be used for additional Message Data bits. Broadcasts can be sent as a block by setting the "BLK XFER" bit or as three separate message types by setting the "MSG XFER" bit. When sent as a block, the first set of MSG TYPE bits may be the message type for the entire block. When three separate messages are sent each of the MSG Type fields may be associated only with their separate Message Data bits.

For additional broadcast blocks, the CONT bit can be set to form a larger broadcast message of an N block set. In this case, the entire N block set message may be repeatedly sent once every 3 minutes at the maximum data rate for 6 times (18 minutes), and then be re-evaluated for the need for an update to the data or re-transmission of another set of broadcasts with the same data. This format can be used, for instance, for display data broadcast to all participating airplanes that are within range. In this case, the receiver of the data may fill in any missing data blocks by receipt of the repeated data prior to display.

The first MSG TYPE field may be toggled between two states, so that the receiver will be aware of any change in the data being sent. If an entire N block set is not completed prior to receiving a toggled MSG TYPE field, then the receiver may discard that N block set and initiate a new N block set. Thus, an even and an odd MSG Type field may be assigned to N block sets. The second and third MSG Type fields may be used to provide the block numbers being sent where the first block is the total number of blocks to be sent and the last block with the CONT bit set low contains the last block number which may be equal to the number of blocks that was to be sent.

Mixed Format Messages

Both a single broadcast and a single point-to-point communication can simultaneously occur by setting the "BLK XFER" bit, the "PT XFER" bit and the "MSG XFER" bit. In this case, the first message with its associated MSG Type code may be sent point-to-point to the 24 bit ICAO receiver address, and the two other messages with their type codes (less the ICAO ADDR address bits, i.e., 68 total Message Data bits) may be sent as a broadcast.

Text Character Format

SMS text character bit definitions can be used for the message data fields if the proper "MSG Type" code is set.

Future Message Types and Protocol Expansion

Four "MSG TYPE" codes of the first MSG TYPE field (two bits) may be reserved to expand the type codes and protocol methods as required in the future by using a small portion of the Data Bit field for this purpose in conjunction with the new "MSG TYPE" codes.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
    modulating, with an Air Traffic Control (ATC) protocol, a plurality of ATC signal transmissions to include broadcast data;
    segmenting an overlay message into a plurality of data segments;
    modulating each of the plurality of ATC signal transmissions with a respectively different segment of the overlay message; and
    transmitting the plurality of signal transmissions including both the broadcast data and the overlay message including the respective plurality of data segments;
    determining whether the message is intended for a specified recipient; and
    assigning within a data segment:
        a first number of bits for message data if the message is intended for a specified recipient; or
        a second number of bits for message data that is greater in number than the first number of bits, if the message is not intended for a specified recipient.

2. The method of claim 1 wherein the overlay message includes an address of an intended recipient of a portion of the respective plurality of data segments.

3. The method of claim 2 wherein the portion comprises all of the respective plurality of data segments.

4. The method of claim 2 wherein the address comprises an ICAO (International Civil Aviation Organization) identifier.

5. The method of claim 2 wherein the overlay message includes one or more bits to indicate whether the overlay message is for the intended recipient.

6. The method of claim 1 wherein the plurality of signal transmissions are transmitted at a frequency for use by an avionics application.

7. The method of claim 6 wherein the frequency is one of 1090 MHz and 978 MHz.

8. The method of claim 1 wherein the plurality of signal transmissions are transmitted from an aircraft to another aircraft.

9. The method of claim 1 wherein the overlay message includes one or more bits to indicate whether the respective plurality of data segments of the overlay message are related.

10. The method of claim 1 wherein the overlay message includes one or more bits to indicate whether a last one of the respective plurality of data segments of the overlay message is reached.

11. A system, comprising:
    an encoder configured to segment an overlay message into a plurality of data segments;
    a modulator configured to:
        modulate, with an Air Traffic Control (ATC) protocol, a plurality of ATC signal transmissions to include broadcast data; and
        modulate each of the plurality of ATC signal transmissions with a respectively different segment of the overlay message;
    a transmitter configured to transmit the plurality of signal transmissions including both the broadcast data and the overlay message including the respective plurality of data segments; and
    wherein the encoder is configured to process the segment the overlay message so that:
        each data segment has a first number of bits assigned for message data if the message is intended for a specified recipient; and a second number of bits assigned for message data if the message is not intended for a specified recipient; and
        the first number of bits has fewer bits than the second number of bits.

12. The system of claim 11 wherein the overlay message includes an address of an intended recipient of a portion of the respective plurality of data segments.

13. The system of claim 12 wherein the portion comprises all of the respective plurality of data segments.

14. The system of claim 12 wherein the address comprises an ICAO (International Civil Aviation Organization) identifier.

15. The system of claim 11 wherein the plurality of signal transmissions are transmitted by the transmitter at a frequency for use by an avionics application.

16. The system of claim 11 wherein the plurality of signal transmissions is transmitted from an aircraft to another aircraft.

* * * * *